(12) United States Patent
DeMeritt et al.

(10) Patent No.: US 8,295,671 B2
(45) Date of Patent: Oct. 23, 2012

(54) COATED OPTICAL FIBERS AND RELATED APPARATUSES, LINKS, AND METHODS FOR PROVIDING OPTICAL ATTENUATION

(75) Inventors: Jeffery A. DeMeritt, Painted Post, NY (US); James S. Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 405 days.

(21) Appl. No.: 12/579,473

(22) Filed: Oct. 15, 2009

(65) Prior Publication Data

US 2011/0091181 A1    Apr. 21, 2011

(51) Int. Cl.
 *G02B 6/00* (2006.01)
(52) U.S. Cl. ....................................... 385/140
(58) Field of Classification Search ............... 385/140
 See application file for complete search history.

(56) References Cited

U.S. PATENT DOCUMENTS

| | | | |
|---|---|---|---|
| 3,444,478 A | 5/1969 | Gudmundsen et al. | 331/94.5 |
| 4,067,642 A | 1/1978 | King et al. | 350/96 |
| 4,121,457 A | 10/1978 | Yoshida et al. | |
| 4,130,343 A | 12/1978 | Miller et al. | |
| 4,373,778 A | 2/1983 | Adham | |
| 4,381,137 A | 4/1983 | Berg et al. | 350/96.18 |
| 4,516,827 A | 5/1985 | Lance et al. | 350/96.15 |
| 4,544,232 A | 10/1985 | Laude | 350/96.15 |
| 4,743,084 A | 5/1988 | Manning | |
| 4,766,705 A | 8/1988 | Dholakia | |
| 4,770,485 A | 9/1988 | Buckley et al. | 350/96.18 |
| 4,778,241 A | 10/1988 | Haltenorth | |
| 4,921,325 A | 5/1990 | Iri et al. | |
| 4,998,792 A | 3/1991 | Boerstler et al. | 350/96.15 |
| 5,029,972 A | 7/1991 | Lukas et al. | |
| 5,050,956 A | 9/1991 | Carpenter et al. | 385/140 |
| 5,121,457 A | 6/1992 | Foley et al. | |
| 5,162,864 A | 11/1992 | Haigh | 356/73.1 |
| 5,359,687 A | 10/1994 | McFarland et al. | |
| 5,384,872 A | 1/1995 | Jacobs-Cooks et al. | |
| 5,404,417 A | 4/1995 | Johnson et al. | |

(Continued)

FOREIGN PATENT DOCUMENTS

EP    0429877 A2    6/1991

(Continued)

OTHER PUBLICATIONS

International Search Report for PCT/US2010/050088 mailed May 19, 2011, 2 pages.

(Continued)

*Primary Examiner* — Sarah Hahm

(57) ABSTRACT

Coated optical fibers and related apparatuses, links, and methods for optically attenuating light directed to or from optical fibers are disclosed. In one embodiment, an optical fiber includes an optical fiber end. The optical fiber end may be a source end and/or a detector end, and may be angle-cleaved. A coating material is disposed on at least a portion of the optical fiber end and configured to optically attenuate a portion of light directed to the optical fiber end. The material type of the coating material and/or the thickness of the coating material may be selectively controlled to control the amount of optical attenuation. The thickness of the coating material may also be controlled to provide the desired thickness of coating material onto at least a portion of the optical fiber end. The coating material may also be selectively patterned to improve the bandwidth of a multi-mode optical link.

34 Claims, 12 Drawing Sheets

U.S. PATENT DOCUMENTS

| | | | |
|---|---|---|---|
| 5,412,748 A | 5/1995 | Furuyama et al. | |
| 5,416,862 A | 5/1995 | Haas et al. | 385/28 |
| 5,557,695 A | 9/1996 | Yamane et al. | |
| 5,764,832 A | 6/1998 | Tabuchi et al. | |
| 5,831,743 A | 11/1998 | Ramos et al. | |
| 5,930,059 A | 7/1999 | Shimada | |
| 6,062,741 A | 5/2000 | Tachigori | |
| 6,064,786 A | 5/2000 | Cunningham et al. | 385/38 |
| 6,081,637 A | 6/2000 | Rekow | 385/31 |
| 6,144,791 A | 11/2000 | Wach et al. | |
| 6,154,589 A | 11/2000 | Kirk et al. | 385/29 |
| 6,157,757 A | 12/2000 | Giaretta et al. | 385/35 |
| 6,185,346 B1 | 2/2001 | Asawa et al. | 385/28 |
| 6,266,472 B1 | 7/2001 | Norwood et al. | |
| 6,315,464 B1 * | 11/2001 | Plickert et al. | 385/89 |
| 6,330,382 B1 | 12/2001 | Harshbarger et al. | 385/28 |
| 6,445,838 B1 | 9/2002 | Caracci et al. | |
| 6,456,766 B1 | 9/2002 | Shaw et al. | |
| 6,491,447 B2 | 12/2002 | Aihara | |
| 6,501,884 B1 | 12/2002 | Golowich et al. | 385/38 |
| 6,504,107 B1 | 1/2003 | Kragl | |
| 6,530,697 B1 | 3/2003 | Johnson et al. | 385/88 |
| 6,556,329 B1 | 4/2003 | Simcoe et al. | 359/188 |
| 6,597,835 B2 | 7/2003 | Jie et al. | |
| 6,672,773 B1 | 1/2004 | Glenn et al. | |
| 6,724,959 B1 | 4/2004 | Takahashi et al. | |
| 6,754,427 B2 | 6/2004 | Steinberg et al. | |
| 6,792,178 B1 | 9/2004 | Zhou | 385/31 |
| 6,810,195 B2 | 10/2004 | Bhagavatula et al. | |
| 6,816,653 B2 | 11/2004 | Botet et al. | |
| 6,822,190 B2 | 11/2004 | Smithson et al. | |
| 6,837,654 B2 | 1/2005 | Serrano | |
| 6,848,839 B2 | 2/2005 | Steinberg | |
| 6,928,226 B2 | 8/2005 | Caracci et al. | |
| 7,218,804 B2 | 5/2007 | Brenner et al. | |
| 7,228,032 B2 | 6/2007 | Blauvelt et al. | 385/31 |
| 7,245,811 B2 | 7/2007 | Takeda et al. | |
| 7,254,300 B2 | 8/2007 | Nishie et al. | |
| 7,283,701 B2 | 10/2007 | Hallemeier et al. | 385/28 |
| 7,400,797 B2 | 7/2008 | Bhagavatula et al. | |
| 7,477,815 B2 | 1/2009 | Jenkins et al. | 385/31 |
| 2002/0057883 A1 | 5/2002 | Malone et al. | |
| 2002/0097974 A1 | 7/2002 | Matsumoto et al. | |
| 2002/0181899 A1 | 12/2002 | Tartaglia et al. | |
| 2003/0072525 A1 | 4/2003 | Sjodin et al. | 385/31 |
| 2004/0114874 A1 | 6/2004 | Bono et al. | |
| 2004/0184492 A1 | 9/2004 | Windover | 372/31 |
| 2004/0190851 A1 | 9/2004 | Garner et al. | |
| 2005/0025430 A1 | 2/2005 | Bhagavatula et al. | |
| 2005/0129367 A1 * | 6/2005 | Koshinz et al. | 385/42 |
| 2006/0045427 A1 | 3/2006 | Sano et al. | |
| 2006/0045452 A1 | 3/2006 | Williams | 385/128 |
| 2008/0246957 A1 | 10/2008 | Beranek | |
| 2008/0260379 A1 | 10/2008 | Beranek | |
| 2009/0010596 A1 | 1/2009 | Matthijsse et al. | 385/32 |

FOREIGN PATENT DOCUMENTS

| | | |
|---|---|---|
| JP | 59-046616 | 3/1984 |
| WO | 9506270 A2 | 3/1995 |
| WO | WO 97/33390 | 9/1997 |
| WO | 2004010190 A1 | 1/2004 |
| WO | 2004055568 A1 | 7/2004 |
| WO | 2004095101 A1 | 11/2004 |

OTHER PUBLICATIONS

Non-final Office Action for U.S. Appl. No. 12/570,714 mailed May 24, 2012, 9 pages.

Advisory Action for U.S. Appl. No. 12/570,714 mailed Mar. 8, 2012, 3 pages.

Final Office Action for U.S. Appl. No. 12/570,714 mailed Dec. 23, 2011, 10 pages.

Non-final Office Action for U.S. Appl. No. 12/570,714 mailed Jul. 14, 2011, 9 pages.

Advisory Action for U.S. Appl. No. 12/570,714 mailed Feb. 22, 2011, 3 pages.

Final Office Action for U.S. Appl. No. 12/570,714 mailed Nov. 29, 2010, 12 pages.

Non-final Office Action for U.S. Appl. No. 12/570,714 mailed Jun. 16, 2010, 9 pages.

Non-final Office Action for U.S. Appl. No. 12/570,752 mailed Apr. 24, 2012, 16 pages.

* cited by examiner

COATED OPTICAL FIBERS AND RELATED APPARATUSES, LINKS, AND METHODS FOR PROVIDING OPTICAL ATTENUATION

BACKGROUND

1. Field of the Disclosure

The technology of the disclosure relates to optical attenuation of light communicated to and/or from an optical fiber.

2. Technical Background

Optical fibers can be used to transmit or process light in a variety of applications. Examples include delivering light to and receiving light from integrated optical components or devices formed on substrates, and transmitting information channels in wavelength-division multiplexed optical communication devices and systems. Other examples include forming fiber optic switch matrix devices or fiber array to array connectors, and producing optical gain for optical amplification or laser oscillation. Optical fibers essentially operate as "light pipes" to confine light within the optical fiber boundary and transfer light from one point to another.

A typical optical fiber may be simplified as having an optical fiber core and a cladding layer surrounding the optical fiber core. The refractive index of the optical fiber core is higher than that of the cladding to confine light. Light rays coupled into the optical fiber core within a maximum angle with respect to the longitudinal optical fiber axis of the optical fiber core are totally internally reflected at the interface of the optical fiber core and the cladding. Total internal reflection (TIR) is an optical phenomenon that occurs when a ray of light strikes a medium boundary at an angle larger than the critical angle with respect to the normal to the surface. If the refractive index of the material on the other side of the boundary is lower, no light can pass through and all of the light is reflected. The critical angle is the angle of incidence above which TIR occurs. This TIR spatially confines the optical energy of the light rays in one or more selected optical fiber modes to guide the optical energy along the optical fiber core.

The optical power level of an optical fiber link is a function of the optical power level of an optical light source. The optical power level of the optical light source may need to be greater than a predefined minimum optical power level to minimize detection error due to optical detector noise. However, in many optical fiber links, the optical power level must be controlled to not exceed a predefined maximum optical power level such as to meet eye safety requirements or to avoid optical detector saturation. Thus, the optical power level may be controlled to be between a minimum optical power level to minimize detection error and a maximum optical power level for eye safety. However, limiting the maximum optical power level to a predefined maximum optical power level, such as to meet eye safety requirements for example, may limit performance of an optical fiber link. Vertical Cavity Surface Emitting Lasers (VCSELs) for example, operate most efficiently at particular levels of optical power. Departures from this optimal power can reduce efficiency, speed or reliability.

SUMMARY OF THE DETAILED DESCRIPTION

Embodiments disclosed in the detailed description include coated optical fibers and related apparatuses, links, and methods for optically attenuating light either launched into an optical fiber or received from an optical fiber. In one embodiment, the optical fiber includes an optical fiber end. For example, the optical fiber end may be a source end configured to be placed or mounted adjacent an optical light source to receive light launched from the optical light source and/or a detector end configured to be placed or mounted adjacent an optical detector that receives light from the optical fiber. A coating material is disposed on at least a portion of the optical fiber end and configured to optically attenuate a portion of light directed to the optical fiber end.

In this manner as an example, an optical light source may be controlled to produce light directed towards the optical fiber at higher output optical power levels while limiting the maximum optical power levels in the optical fiber. For example, an optical fiber may be limited in optical power to meet eye safety requirements or to avoid optical detector saturation. However, driving the optical light source to a maximum optical power output level beyond such limitations may be desired. For example, the linearity of an optical light source may improve when driven above certain threshold drive current. Further, driving an optical light source at higher optical power levels may produce a far-field light pattern that excites a limited number or predetermined set of modes or mode groups. Limiting the number of excited modes or mode groups in a multi-mode optical fiber link can reduce modal dispersion and improve optical fiber link bandwidth as a result. As another example, overdriving an optical light source can compensate for variation conditions that can reduce optical power such as temperature or aging effects of the optical light source.

Further, disposing a coating material on a detector end of an optical fiber to optically attenuate light may also be desired. Disposing a coating material on a detector end of an optical fiber to optically attenuate light may allow limiting certain modes or mode groups of light detected by an optical detector from the optical fiber, which may reduce modal dispersion thereby increasing bandwidth performance.

The material type of the coating material and/or the thickness of the coating material may be selectively controlled to control the amount of optical attenuation provided by the coating material. The thickness of the coating material may be controlled by a coating material removal process or a process to deposit the desired thickness of coating material, as examples. In other embodiments, the coating material disposed on the optical fiber end may be disposed in an optical attenuation pattern. The optical attenuation pattern may block or attenuate certain modes or mode groups of light while allowing other modes or mode groups of light to pass through the coating material. In this manner, the optical attenuation pattern may serve to limit the number of modes or mode groups excited in an optical fiber and/or the number of modes or mode groups detected by an optical detector to limit modal dispersion, thus increasing bandwidth performance.

In another embodiment, a method of providing optical attenuation for an optical fiber link is provided. The method includes providing an optical fiber having an optical fiber end. The optical fiber end may be a source end and/or a detector end. A coating material is disposed on at least a portion of the optical fiber end configured to optically attenuate a portion of light directed to the optical fiber end. The optical fiber end may be angle-cleaved to provide a reflection facet for reflecting light. The reflected light may be light received from an optical source if the optical fiber end is a source end, or propagated light reflected to an optical detector is the optical fiber end is a detector end. The angle cleaving of the optical fiber end may be performed by laser cleaving or polishing the optical fiber end, as examples.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include coated optical fibers and related apparatuses, links, and methods for optically attenuating light either launched into an optical fiber or received from an optical fiber. In one embodiment, the optical fiber includes an optical fiber end. For example, the optical fiber end may be a source end configured to be placed or mounted adjacent an optical light source to receive light launched from the optical light source and/or a detector end configured to be placed or mounted adjacent an optical detector that receives light from the optical fiber. A coating material is disposed on at least a portion of the optical fiber end and configured to optically attenuate a portion of light directed to the optical fiber end.

In this manner as an example, an optical light source may be controlled to produce light directed towards the optical fiber at higher output optical power levels while limiting the maximum optical power levels in the optical fiber. For example, an optical fiber may be limited in optical power to meet eye safety requirements or to avoid optical detector saturation. However, driving the optical light source to a maximum optical power output level beyond such limitations may be desired. For example, the linearity of an optical light source may improve when driven above certain threshold drive current. Further, driving an optical light source at higher optical power levels may produce a far-field light pattern that excites a limited number or predetermined set of modes or mode groups. Limiting the number of excited modes or mode groups in a multi-mode optical fiber link can reduce modal dispersion and improve optical fiber link bandwidth as a result. As another example, overdriving an optical light source can compensate for variation conditions that can reduce optical power such as temperature or aging effects of the optical light source.

Further, disposing a coating material on a detector end of an optical fiber to optically attenuate light may also be desired. Disposing a coating material on a detector end of an optical fiber to optically attenuate light may allow limiting certain modes or mode groups of light detected by an optical detector from the optical fiber, which may reduce modal dispersion thereby increasing bandwidth performance.

Figure 1:
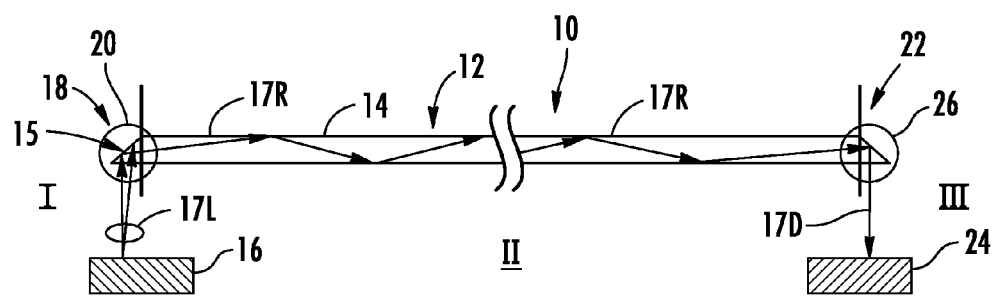
FIG. 1 is an exemplary optical fiber link comprised of an optical fiber disposed between an optical light source launching light into a source end of the optical fiber and an optical detector detecting the launched light at a detector end of the optical fiber.
Figure 2:
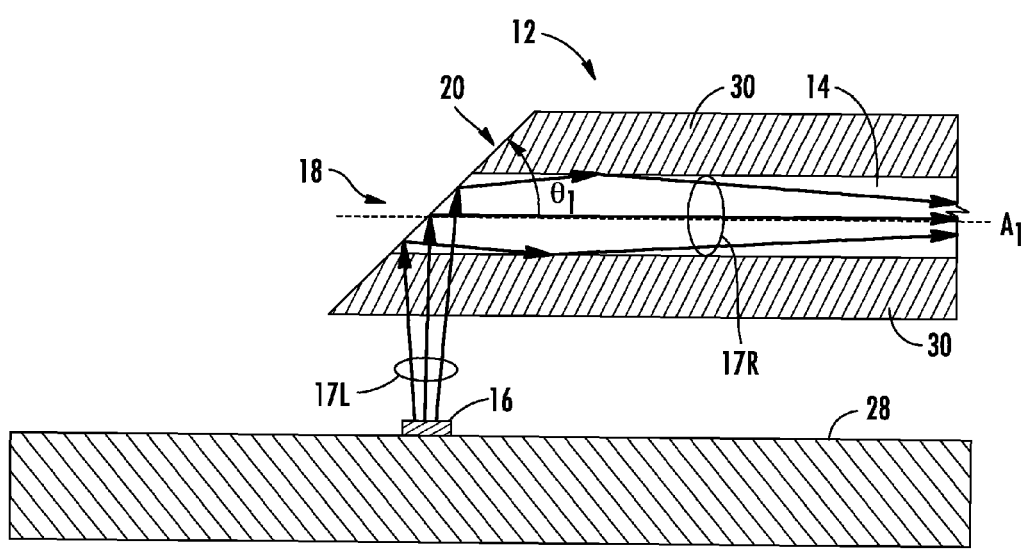
FIG. 2 is a close-up side view of the source end of the optical fiber of FIG. 1.

Before discussing disposing of a coating material on an optical fiber to provide optical attenuation, an exemplary optical fiber link is discussed with regard to FIGS. 1 and 2. In this regard, FIG. 1 illustrates an exemplary optical fiber link 10. The optical fiber link 10 is comprised of an optical fiber 12 that comprises an internal core 14. The optical fiber 12 in this embodiment is a multi-mode optical fiber, meaning that multiple propagation paths exist in the internal core 14 defined by a launch angle of light launched into a face 15 disposed on a source end 18 of the optical fiber 12. However, a single-mode optical fiber could be employed in the optical fiber link 10. Only the internal core 14 of the optical fiber 12 is illustrated in FIG. 1, but it is understood that a cladding layer (not shown) is provided in the optical fiber 12 to surround the internal core 14 to generally confine light within the internal core 14 as it propagates down the optical fiber 12. An example of cladding surrounding the internal core 14 of the optical fiber 12 is illustrated in FIG. 2, described below.

With reference to FIG. 1, an optical light source 16 is disposed on the source end 18 of the optical fiber 12 in this embodiment to launch light 17L into the optical fiber 12 in a first zone (I). The light 17L is coupled from the optical light source 16 into the optical fiber 12 using total internal reflection (TIR). In this regard, the source end 18 of the optical fiber 12 is cleaved at an angle via a laser (i.e., laser-cleaved) (hereafter referred to as a cleaved fiber end 20, an angle-cleaved fiber end 20, or a laser-cleaved fiber end 20) to internally reflect the light 17R into the internal core 14 of the optical fiber 12. The optical light source 16 may be a vertical-cavity surface-emitting laser (VCSEL) as an example, or other optical light source. The light 17R propagates down the internal core 14 of the optical fiber 12 in a second zone (II) until it reaches a detector end 22 of the optical fiber 12 opposite the source end 18. The light 17R propagating down the optical fiber 12 is shown in FIG. 1 as following a series of straight lines along the internal core 14, as would be the case when a step-index internal core index profile is employed. These lines are also intended to represent generally non-straight paths followed by light in graded-index internal cores profiles. An optical detector 24 is disposed on the detector end 22 of the optical fiber 12 to detect light 17R propagated down the optical fiber 12. An angle-cleaved fiber end 26 is also disposed at the detector end 22 of the optical fiber 12 to redirect the light 17R downward as light 17D onto the optical detector 24 in a third zone (III) for detection.

FIG. 2 illustrates a close-up side view of the source end 18 of the optical fiber 12 of FIG. 1 to provide more detail regarding the angle-cleaved fiber end 20 of the optical fiber 12 in this example. As illustrated in FIG. 2, the optical fiber 12 is positioned such that the angle-cleaved fiber end 20 is aligned with the optical light source 16 to receive the light 17L launched from the optical light source 16. The optical fiber 12 is configured to receive the light 17L launched perpendicular to an optical fiber axis $A_1$ of the optical fiber 12 in this embodiment. The optical light source 16 is disposed on a substrate 28 wherein the optical fiber 12 may be aligned with the optical light source 16 to achieve efficient light signal transfer from the optical light source 16 to the optical fiber 12. The angle $\Theta_1$ of the angle-cleaved fiber end 20 may be provided such that the light 17L launched from the optical light source 16 may be reflected, via TIR reflection, at the angle-cleaved fiber end 20 and redirected down the internal core 14 of the optical fiber 12 as light 17R. For example, in one embodiment, the angle $\Theta_1$ of the angle-cleaved fiber end 20 may be approximately forty-five (45) degrees, or other angles, to provide improved optical performance (e.g., reduced back reflection, increased bandwidth in multi-mode fibers, etc.). The light 17R reflected from the angle-cleaved fiber end 20 generally remains in the internal core 14 by reflecting off of cladding 30 surrounding the internal core 14 of the optical fiber 12 as the light 17R propagates along the internal core 14 towards the detector end 22 (see also, FIG. 1).

Since the light 17L from the optical light source 16 is diverging at divergence angles in this embodiment, the light 17L is launched into the internal core 14 over a range of angles. Thus, the light 17L is launched off the angle-cleaved fiber end 20 as light 17R at launch angles with respect to the optical fiber axis $A_1$. This can result in excitation of multiple modes or mode groups of the multi-mode optical fiber 12 thereby introducing modal dispersion. A mode group is a family of light rays that have the same propagation path down the internal core 14 such that they arrive at the detector end 22 at the same time to form a group. Modal dispersion can limit the bandwidth of the optical fiber link 10. Further, modal dispersion can increase as the length of the optical fiber 12 increases.

In many optical fiber links, such as the optical fiber link 10 in FIGS. 1 and 2, and including both single-mode and multi-mode optical fiber links as examples, the optical power level of light received by an optical detector from an optical fiber can be controlled. The optical power level of light can be controlled to be greater than a predefined minimum optical power level to minimize bit errors due to noise, including optical detector noise. As an example, the light 17D received by the optical detector 24 in FIG. 1 may be required to meet or exceed an optical power level of −10 dBm to provide bandwidths up to 20 Gigabits per second (Gbps). To control the optical power level of the received light to be greater than a pre-defined minimum optical power level, an optical light source can be controlled to control the optical power of light launched into the internal core of an optical fiber. In this regard, the optical light source could be controlled to launch light at its maximum output power level into an optical fiber. However, many optical fiber links and related applications define a maximum optical power level for the optical light source, such as to meet eye safety requirements or to avoid optical detector saturation, as examples. For example, the maximum optical power level may be +3 dBm. In this regard, an optical light source may be controlled to launch light into an optical fiber at optical power levels between minimum and maximum pre-defined optical power levels.

There are a number of reasons why it may be desirable to drive an optical light source at operating points that exceed a maximum pre-defined optical power level or limit of an optical fiber link. For example, the linearity of an optical light source may improve when driven above certain threshold drive currents, resulting in a more open eye diagram for improved performance at higher operating frequencies. Further, in multi-mode optical fiber links, driving an optical light source at higher optical power levels may produce a far-field light pattern that excites a limited number or predetermined set of modes or mode groups. For example, the shape of a VCSEL optical light source far-field light pattern changes as a function of drive current. Limiting the number of excited modes or mode groups in a multi-mode optical fiber link can reduce modal dispersion and improve optical fiber link bandwidth as a result. Also, it may be desirable to overdrive an optical light source, such as a VCSEL for example, to compensate for variation conditions that can reduce optical power. For example, variations in temperature may change optical power output for a given drive current provided to the optical light source. Also, optical power levels of semiconductor-based optical light sources, such as VCSELs for example, may reduce over time due to semiconductor aging effects.

Figure 3:
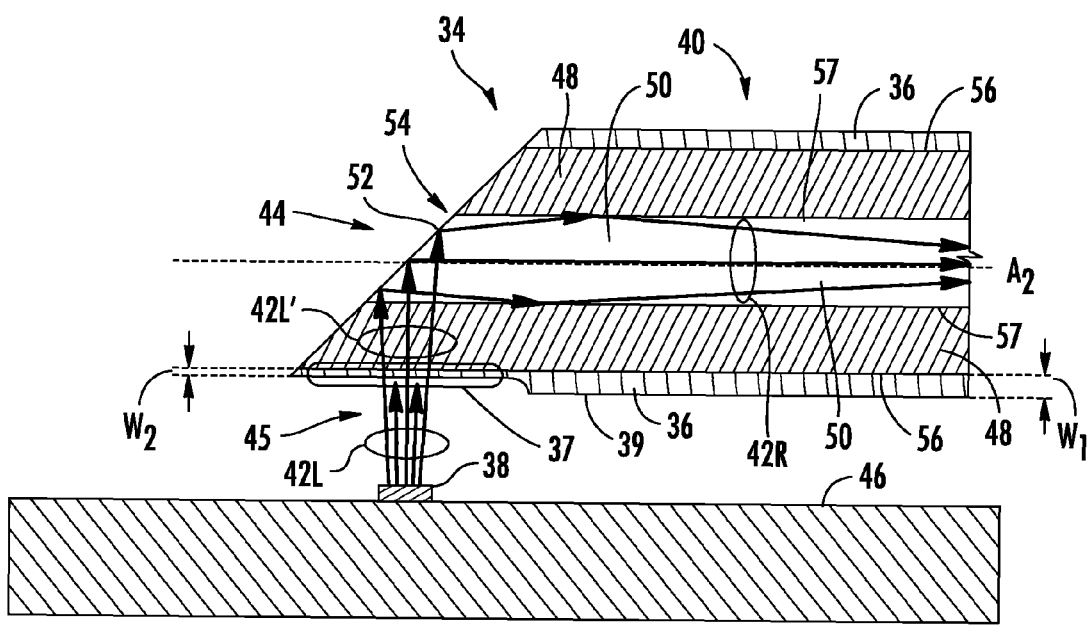
FIG. 3 is a side view of an exemplary coating material disposed on a source end of an exemplary optical fiber for optically attenuating light launched by an optical light source towards the optical fiber.

To operate an optical light source at higher output optical power levels while limiting the maximum optical power levels in an optical fiber link, optical attenuation can be introduced. In this regard, FIG. 3 illustrates a side view of an exemplary embodiment of an optical fiber link 34 wherein optical attenuation is disposed between an optical light source 38 and an optical fiber 40. In this embodiment, and as will be described in further detail below, optical attenuation is provide in the form of a coating material 36. The coating material 36 is a material applied or induced around at least a portion of the optical fiber 40. In this embodiment, the disposed coating material 36 is on an outer surface 39 of the optical fiber 40. The coating material 36 has light absorption characteristics to provide the optical attenuation. In this embodiment, a portion 37 of the coating material 36 that provides optical attenuation is disposed in a light path 45 between the optical light source 38 and the optical fiber 40 where light 42L launched by the optical light source 38 passes before reaching the optical fiber 40. As a result, the absorption characteristics of the coating material 36 attenuate the light 42L launched into the optical fiber 40.

The light absorption characteristics of the coating material 36 and the thickness of the portion 37 of the coating material 36 disposed in the light path 45 control the amount of optical attenuation of the light 42L launched into the optical fiber 40. The thickness of the portion 37 of the coating material 36 can be controlled to control the amount of optical attenuation of the light 42L. The coating material 36 optically attenuates the light 42L into optically attenuated light 42L', as illustrated in FIG. 3. In this manner, the optical light source 38 may be driven to launch light 42L at higher output optical power levels that may exceed maximum optical power levels for the optical fiber link 34, but in a manner such that the optically attenuated light 42L' and light 42R reflected from the optically attenuated light 42L' does not exceed the maximum optical power levels for the optical fiber link 34. As previously discussed above, the optical fiber link 34 may have predefined maximum optical power levels to meet certain specifications or requirements, such as eye safety or to avoid optical detection saturation as examples, wherein the predefined maximum optical power level is lower than the maximum output optical power level that can be provided by the optical light source 38.

With continuing reference to FIG. 3, the optical attenuation provided by the portion 37 of the coating material 36 is disposed at a source end 44 of the optical fiber 40. The optical light source 38 is disposed on a substrate 46 in this embodiment. The optical fiber 40 may be aligned with the optical light source 38 to achieve efficient transfer of light 42L launched from the optical light source 38 into the optical fiber 40. As illustrated in FIG. 3, light 42L is launched into the optical fiber 40 from the optical light source 38 perpendicular to an optical fiber axis $A_2$ into a cladding 48 of the optical fiber 40 in this embodiment. Other launch angles and fiber angles relative to substrate 46 are possible. The coating material 36 is disposed between the cladding 48 and the optical light source 38 such that the light 42L must pass through the portion 37 of the coating material 36 before reaching the cladding 48. The cladding 48 surrounds an internal core 50 of the optical fiber 40. The light 42L is optically attenuated as optically attenuated light 42L' as illustrated in FIG. 3. The amount of optical attenuation is a function of the type of coating material 36 and its thickness, examples of which will be described in more detail below. The optically attenuated light 42L' then passes through the cladding 48 and enters the internal core 50 of the optical fiber 40 where it is then reflected through total internal reflection (TIR) off an angle-cleaved end facet 52 (or face) of an angle-cleaved fiber end 54 of the optical fiber 40. As a result, the reflected light 42R is redirected down the internal core 50 of the optical fiber 40 at angles non-parallel to an optical fiber axis $A_2$ of the optical fiber 40.

Because the light 42L is optically attenuated, the optical light source 38 can be controlled to launch light 42L at a higher optical output power level than the optical power level of the reflected light 42R reflected down the internal core 50 of the optical fiber 40. For example, as discussed above, it may be desirable for enhanced performance or optical fiber link bandwidth as examples, to drive the optical light source 38 to produce light 42L at higher output optical power levels. If, for any reason, such higher output optical power levels exceed a desired or designed maximum optical power level for the optical fiber link, the optical attenuation provided by the portion 37 of the coating material 36 can be designed to optically attenuate the light 42L into optically attenuated light 42L' to reduce the optical power level of light 42L entering the cladding 48 and/or the internal core 50 of the optical fiber 40.

Since the light 42L from the optical light source 38 is diverging at divergence angles in this embodiment, the optically attenuated light 42L' is launched into the internal core 50 of the optical fiber 40 over a range of angles. Thus, the optically attenuated light 42L' is launched off the angle-cleaved end facet 52 as reflected light 42R at large launch angles. This can result in excitation of multiple modes or mode groups of the optical fiber 40 thereby introducing modal dispersion. A mode group is a family of light rays that have the same propagation path down the internal core 50 such that they arrive at a detector end of the optical fiber 40 at the same time. Modal dispersion can limit the bandwidth of the optical fiber link 34. Further, modal dispersion can increase as the length of the optical fiber 40 increases. The light 42L could also be launched by the optical light source 38 into the internal core 50 of the optical fiber 40 at smaller launch angles so that fewer modes or modes groups in the internal core 50 are excited thereby reducing modal dispersion.

The coating material 36 in this embodiment is integrated into the angle-cleaved fiber end 54 of the optical fiber 40, as illustrated in FIG. 3. The angle-cleaved fiber end 54 may also be laser-cleaved or cleaved by a polishing process, as discussed above. Angled-cleaved fiber ends, or facets on optical fiber ends, may be formed using laser processing according to known methods for cleaving. For example, a laser cleaving station consisting of a carbon-dioxide ($CO_2$) laser with a variable beam expander and a twenty-five (25) millimeter (mm) focal length focusing lens may be used. Thus, when the optical fibers are cleaved using a laser, the optical fibers or ends of optical fibers may also be referred to as laser-cleaved fibers, or laser-cleaved ends. The laser process may be used to form an angled facet on a single optical fiber or on a group of optical fibers arranged in a one-dimensional (1-D) or two-dimensional (2-D) array. An optical fiber having a laser-cleaved end with an angle can be used for many purposes. For example, an optical source, such as a VCSEL, emits a light beam vertically and therefore a right angle, or ninety (90) degree, turn is often necessary out of compactness considerations for certain applications. The optical fiber having a laser-cleaved end with an angle can also be used to achieve the needed right angle turn of the light into an optical detector, such as optical detector 24 shown in FIG. 1 by example.

The coating material 36 is disposed on an outer surface 56 of the cladding 48 in the optical fiber 40 in this embodiment, as illustrated in FIG. 3. The coating material 36 may be applied to the outer surface 56 of the cladding 48 of the optical fiber 40 during manufacture either prior to or following angle-cleaving of the optical fiber 40. The coating material 36 may be applied to the entire outer surface 36 or only a portion of the outer surface. If the coating material 36 is applied prior to angle-cleaving, the coating material 36 material will remain on the outer surface 56 of the cladding 48 in this embodiment. In other embodiments, the coating material 36 could be disposed on an outer surface 57 of the internal core 50 of the optical fiber 40, for example, if cladding 48 is not provided in the optical fiber 40 or at the source end 44 of the optical fiber 40. The coating material 36 may also be applied to a fiber surface that results from localized removal of some or all of the cladding 48 near source end 44 of the optical fiber 40, via, for example, laser ablation or polishing operations. The coating material 36 may be applied to the optical fiber 40 using processes that include, but are not limited to dip coating, spraying, brushing, screen printing, sputtering, or chemical vapor deposition The type of coating material 36 affects the amount of optical attenuation according to the light absorption characteristics of the coating material 36. For example, the coating material 36 may be a durable coating material, such as a metal or carbon-based material as examples, that allows light to pass at a designed thickness, but optically attenuated. Examples of metals include, but are not limited to, titanium, aluminum, and gold. Other examples include, but are not limited to, polymer coatings filled with particles that absorb or scatter light, and diffractive gratings or roughened surfaces that scatter light. Examples of polymers include, but are not limited to, acrylate, Teflon (PTFE), and nylon. It may be desirable to provide a coating material 36 that is capable of providing significant light absorption when applied in thin layers to minimize the overall thickness of the optical fiber 40 with the coating material 36 applied.

The coating material 36 may also be an absorptive or dispersive liquid that may be applied to the optical fiber 40 to provide optical attenuation. For example, the optical fiber 40 may be a random airline (RAL) optical fiber instead of a non-RAL optical fiber wherein capillary forces will wick a fluid coating into a set of RAL channels in the light path 45. By adjusting the characteristics of the absorptive or dispersive liquid in this example, or by controlling the manner in which the liquid is distributed in the RAL channels, the optical attenuation may be modified.

In certain embodiments, the coating material 36 may be selected from a material that provides other advantages or purposes. For example, the coating material 36 may be provided as a polymer or acrylic layer, as examples, that protect the outer surface 39 of the optical fiber 40 from damage and/or to preserve the mechanical strength of the optical fiber 40. The type of material of the coating material 36 may also be selected to provide a hermetic seal or barrier layer(s) for the optical fiber 40 and/or to further increase the durability of the optical fiber 40. Examples of coating materials 36 that can provide optical attenuation and hermetic sealing include, but are not limited to, carbon-based coatings and metal-based coatings, such as aluminum or titanium based coatings. The coating material 36 may also be a metallic fiber coating whereby a hermetic seal could be formed by soldering optical fibers 40 coated with the metallic fiber coating into feed-through holes in an optoelectronic package.

As discussed above, the thickness of the portion 37 of the coating material 36 in the light path 45 between the light 42L launched from the optical light source 38 and the optical fiber 40 also controls the amount of optical attenuation of the light 42L. In this regard, the amount of optical attenuation of light 42L can be controlled by adjusting the thickness of the portion 37 of the coating material 36. For example, a coating material removal process may be employed at the time of manufacture to reduce a thickness $W_1$ of the coating material 36 to a thickness $W_2$ to provide the portion 37 of the coating material 36 and thus to adjust the optical attenuation of light 42L, as illustrated in FIG. 3. As illustrated in FIG. 3, the portion 37 of the coating material 36 at the source end 44 of the optical fiber 40 has been removed to reduce the thickness of the coating material 36 to thickness $W_2$ in the light path 45 between the optical light source 38 and the optical fiber 40. This reduces the amount of optical attenuation of light 42L launched by the optical light source 38 into the cladding 48 of the optical fiber 40 over what would otherwise be provided if the light 42L passed through the portion 37 of the coating material 36 at thickness $W_1$.

As examples of thicknesses, thickness $W_1$ may, in the case of carbon based coatings, be two hundred (200) micrometers (µm), and thickness $W_2$ may be ten (10) µm, wherein light 42L is optically attenuated from three (3) dBm to optically attenuated light 42L' of zero (0) dBM as a result of the light 42L passing through the portion 37 of the coating material 36. The thickness of the portion 37 of the coating material 36 left in the light path 45 between the optical light source 38 and the optical fiber 40 after coating removal can be provided at any thickness to achieve the desired optical attenuation performance. If the coating material removal process is performed during manufacture of the optical fiber 40, the coating thickness left in the light path 45 between the optical light source 38 and the optical fiber 40 can be tuned for any application desired. Different thicknesses may be left for different applications during the manufacturing process.

Figure 4:
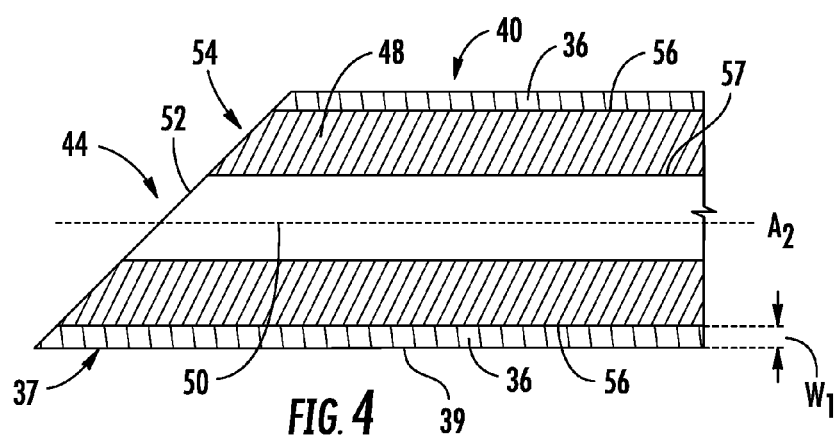
FIG. 4 is a side view of the optical fiber of FIG. 3 with the coating material disposed on the optical fiber and prior to a portion of the coating material being selectively removed to provide the desired optical attenuation.

As discussed above, a coating material removal process may be employed at the time of manufacture to remove the portion 37 of the coating material 36 disposed on the optical fiber 40 to reduce thickness, and as a result, decrease optical attenuation performance provided by the coating material 36. FIG. 4 illustrates the optical fiber 40 of FIG. 3 after an angle-cleaved end facet 52 has been disposed on an angle-cleaved optical fiber end 54 of the optical fiber 40 and the coating material 36 applied to the outer surface 56 of the cladding 48. The angle-cleaved end facet 52 may be provided by a laser cleaving operation or by polishing the optical fiber 40, as examples. If laser cleaving is employed, the coating material 36 may be selected as a non-polymer material, such as carbon or metal as examples, so that the coating material 36 does not change shape or decompose when a portion of the optical fiber 40 to be angle-cleaved is irradiated. A coating material removal process is then be performed on the portion 37 of the coating material 36 to provide a thickness $W_2$ of the coating material 36 in the light path 45 between the optical light source 38 and the optical fiber 40 (see FIG. 3). Examples of coating removal processes can include, but are not limited to, laser ablation, chemical etching, mechanical abrasion, and polishing.

Figure 5:
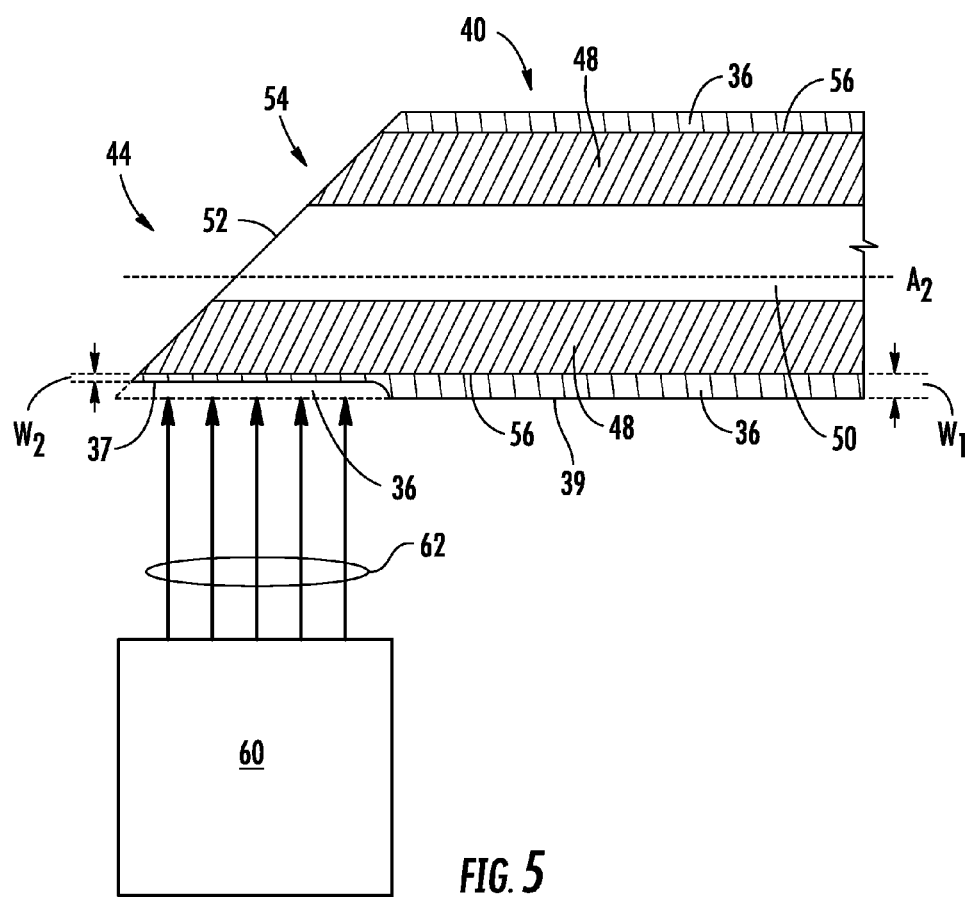
FIG. 5 illustrates an exemplary laser removal of a selective portion of the coating material disposed on the optical fiber of FIG. 4 to provide the desired thickness of the coating material to provide the desired optical attenuation.

For example, FIG. 5 illustrates a coating removal device and process to remove the portion 37 of the coating material 36 of the optical fiber 40 of FIGS. 3 and 4 to reduce the thickness to thickness $W_2$ (FIG. 3) and increase the optical attenuation performance the optical fiber 40. The thickness of the portion 37 of the coating material 36 may be selectively reduced near the source end 44 of the optical fiber 40 so that the desired optical attenuation is disposed in the light path 45 when the optical fiber 40 is aligned with the optical light source 38. As illustrated in FIG. 5, a laser 60 is provided. The laser 60 may be a $CO_2$ laser operating at wavelength of 10.6 µm, as an example. The laser 60 is positioned to emit a laser beam 62 onto the portion 37 of the coating material 36 to be removed to reduce the thickness to thickness $W_2$ in this example. The laser beams 62 ablate portions of the coating material 36 to reduce the thickness of the coating material 36 as desired. In this embodiment, the laser 60 is controlled such that the laser beams 62 are directed to the portion 37 of the coating material 36 in the light path 45 between the optical light source 38 (FIG. 3) and the optical fiber 40. The portion 37 of the coating material 36 removed to selectively control the residual thickness can be varied by adjusting the strength and duration of the laser beams 62 applied to the coating material 36. The laser 60 could also direct the laser beams 62 onto the coating material 36 parallel to the optical axis $A_2$ rather than perpendicular, as illustrated in FIG. 5, to remove the portion 37 of the coating material 36. Alternatively, the laser 60 could direct the laser beam 62 at the coating material 36 from either side of the optical fiber 40, in a direction into or out of the page of FIG. 5.

Again, other removal processes are possible, and the optical fibers, coating removal devices, and process embodiments disclosed herein are not limited to laser removal or ablation. Other processes may be employed to dispose a coating material on an optical fiber to provide optical attenuation, including the optical attenuation in FIG. 3, other than a coating removal process. For example, a chemical treatment compatible with the coating material 36 may be applied to the coating material 36 to remove a portion of the coating material 36 to control thickness. A photolithographic masking and/or etching process may be employed. The thickness of the coating material 36 may also be controlled by controllably applying the coating material 36 to the optical fiber 40 to the desired thickness without performing a removal process. In this case, a coating material may be applied to an entire optical fiber or a portion of an optical fiber, such as the source end 44 of the optical fiber 40 in FIG. 3, as an example. Examples of coating disposition or depositing processes on an optical fiber include, but are not limited to, dip coating, spraying, brushing, screen printing, sputtering, or chemical vapor deposition. The type of coating material 36 may also be selected to assist in the removal process for controlling thickness. For example, laser-assisted oxidation of a coating material 36 that is subject to oxidation, such as a carbon or metal-based coating material for example, may be employed to control the thickness of the coating material 36.

Regardless of how the thickness of a coating material disposed on an optical fiber is provided or controlled, providing optical attenuation via a coating material disposed on the body of an optical fiber has certain non-limiting advantages. For example, if the coating material is integral with the body of the optical fiber, the optical attenuation provided by the coating material can function independent of the position of an optical light source and its light field structure with respect to the optical fiber. If the coating material is applied to the entire circumference of an optical fiber, the optical attenuation provided by the coating material will be self-aligned to the optical fiber simplifying the assembly process of the optical fiber. If coating materials are required to be disposed around optical fibers for other reasons, such as metalized or hermetic fiber coating materials using hermetic package feed-through sealing as an example, this same coating material can be selectively removed to control optical attenuation without requiring additional materials or parts. Regardless, providing an optical fiber coating material as an optical attenuator does not require additional parts for the optical light source or to be disposed between the optical light source and the optical fiber.

As discussed above, a portion of a coating material disposed on an optical fiber can be removed to the desired thickness provide optical attenuation of a light launched into the optical fiber. As also described above, the desired thickness of the coating material can be provided by a deposition process without employing removal if the deposition process allows control of depositing of the coating material to the desired thickness for the desired optical attenuation performance. Providing a coating material removal process to control the thickness of coating material disposed onto an optical fiber to provide optical attenuation may have alternative or additional features and benefits. For example, a single thickness of a coating material may be applied to an optical fiber wherein the amounts of the coating material removed can be controlled and adjusted as needed to tune the amount of optical attenuation desired depending on application of the processed optical fiber. Selectively controlling the removal of the coating material in the light path between an optical light source and an optical fiber so that only certain modes or mode groups of the optical fiber are excited by the optical light source are described below by examples in more detail.

Figure 6:
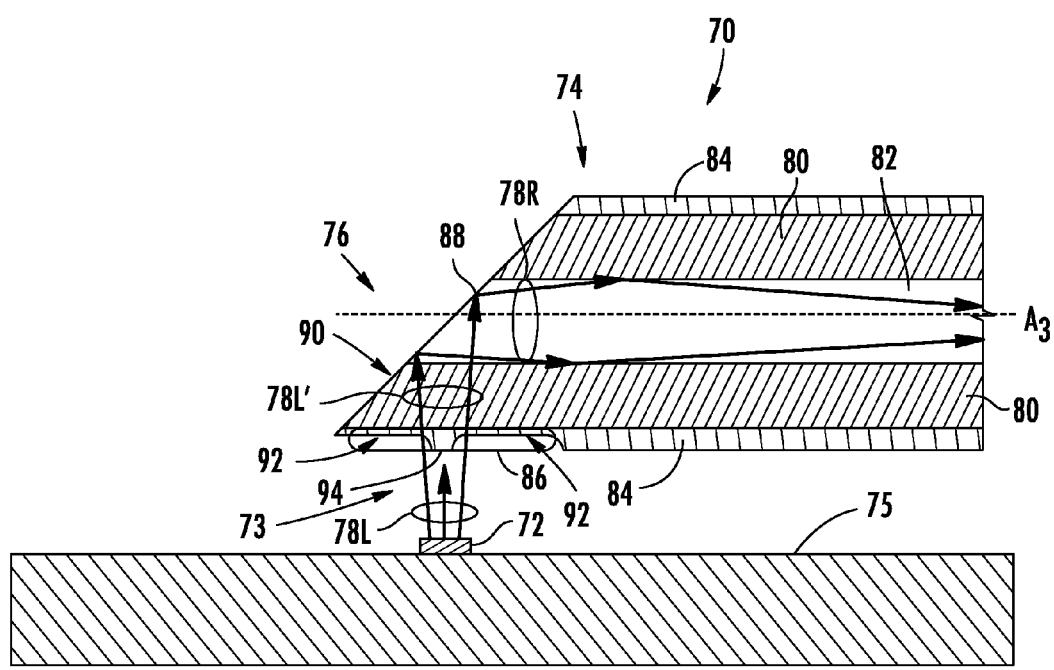
FIG. 6 is a side view of an exemplary selective optical attenuation pattern disposed in a coating material disposed on a source end of an exemplary optical fiber configured to block or attenuate certain modes and/or mode groups from being excited in the optical fiber.
Figure 7:
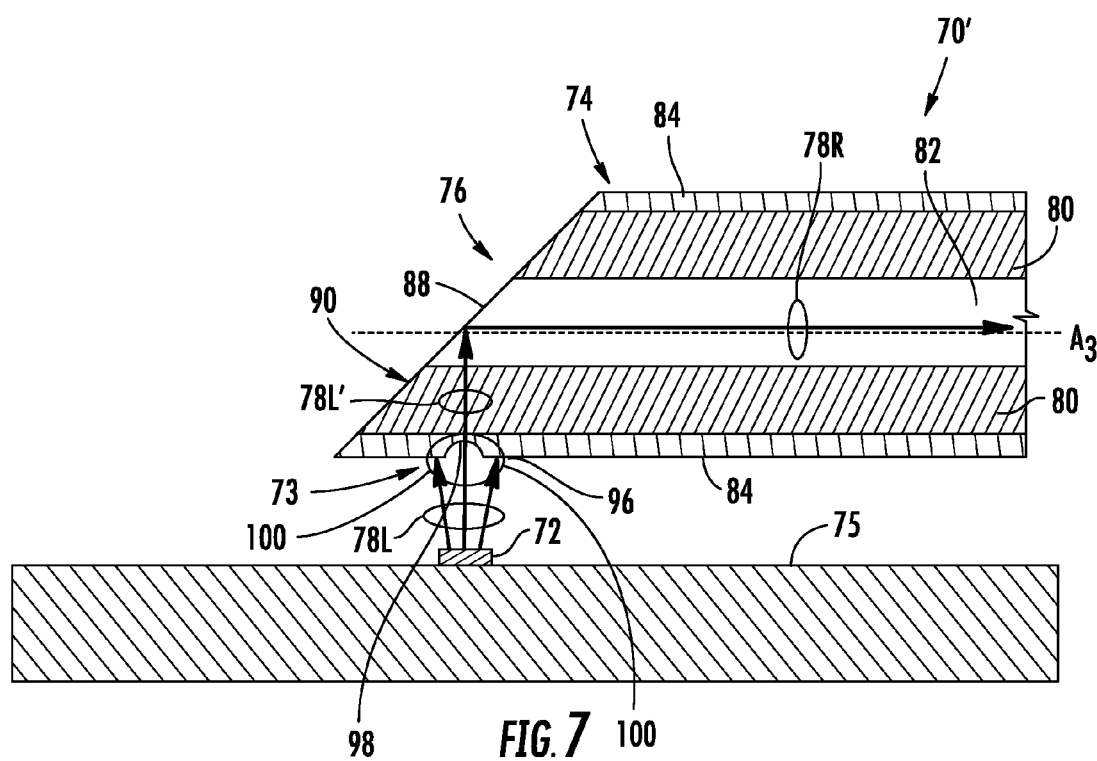
FIG. 7 is a side view of another exemplary selective optical attenuation pattern disposed in a coating material disposed on a source end of an exemplary optical fiber configured to reduce the number of modes and/or mode groups excited in the optical fiber.

Embodiments discussed above with regards to FIGS. 3-5 include removal of the portion 37 of the coating material 36 to a uniform or substantially uniform residual thickness to provide optical attenuation. As a result, the optical attenuation provided by the residual coating material 36 in the light path 45 may be uniform or substantially uniform for different orders or modes of light 42L launched from the optical light source 38 into the optical fiber 40. However, it is also possible to remove a specific region or regions of a coating material disposed on an optical fiber to provide specific optical attenuation patterns or masks such that different orders or modes of light launched into an optical fiber are not uniformly optically attenuated. In this regard, FIGS. 6 and 7 illustrate embodiments of optical fibers wherein a portion(s) of a coating material disposed around the optical fibers are selectively removed according to a desired optical attenuation pattern or mask. As a result, the optical fiber is configured such that different orders or modes of light launched by an optical light source into the optical fiber are not uniformly optically attenuated.

Turning to FIG. 6, a side view of another exemplary optical fiber link 70 is provided wherein a coating material to provide optical attenuation is disposed between an optical light source 72 and an optical fiber 74. The optical light source 72 and the optical fiber 74 may be the same or similar optical light source and optical fiber as the optical light source 38 and optical fiber 40 illustrated in FIGS. 3-5 and previously described. In this regard, the optical fiber 74 may be mounted on a substrate 75 such that a source end 76 of the optical fiber 74 is aligned with the optical light source 72 to achieve efficient transfer of light 78L launched from the optical light source 72 into the optical fiber 74.

As illustrated in FIG. 6, the light 78L is launched into the optical fiber 74 from the optical light source 72 along a light path 73 perpendicular to an optical fiber axis $A_3$ into a cladding 80 of the optical fiber 74 in this embodiment. The cladding 80 surrounds an internal core 82 of the optical fiber 74. The light 78L is optically attenuated as optically attenuated light 78L' as the light 78L passes through a coating material 84 that optically attenuates, and more specifically through a ring mask or ring pattern 86 of the coating material 84 selectively removed or deposited to a desired thickness to provide the amount of optical attenuation desired, as previously discussed. The type of coating material 84 and the removal or depositing processes to provide the desired thickness of the coating material 84 may be any of those previously described. The optically attenuated light 78L' then passes through the cladding 80 and enters the internal core 82 of the optical fiber 74 where it is then reflected as light 78R through total internal reflection (TIR) off an angle-cleaved end facet 88 (or face) of an angle-cleaved fiber end 90 of the optical fiber 74. As a result, the reflected light 78R is redirected down the internal core 82 of the optical fiber 74 at angles non-parallel to the optical fiber axis $A_3$ of the optical fiber 74.

In this embodiment, the ring pattern 86 disposed in the coating material 84 is provided by removing portions of the coating material 84 in a ring region 92 around a central portion or spot 94 of the coating material 84. When the optical fiber 74 is aligned with the optical light source 72, as illustrated in FIG. 6 for example, the central portion 94 of the coating material 84 is configured to block or substantially attenuate the light 78L launched from the optical light source 72 that would normally reflect off the angled-cleaved end facet 88 and be guided down the internal core 82 at angles generally parallel or substantially parallel to the optical fiber axis $A_3$. This angle corresponds to the propagation direction for lower-order guided fiber modes in this embodiment. Thus, the ring pattern 86 disposed in the coating material 84 disposed on the optical fiber 74 in this embodiment is configured to block or filter lower-order mode light. The light 78L launched from the optical light source 72 at higher angles passes through the ring region 92 of the coating material 84 and is able to pass as attenuated light 78L' to the optical fiber 74. This results in excitation of higher-order modes or mode groups in the optical fiber 74, which may limit modal dispersion and improve optical fiber link bandwidth of the optical fiber link 70.

FIG. 7 illustrates an embodiment wherein a coating material mask or pattern is disposed in coating material disposed on an optical fiber and configured to block or substantially attenuate light launched from an optical light source that would normally be reflected and guided down the optical fiber at angles that are not generally parallel or substantially parallel to an optical fiber axis of the optical fiber. This angle would correspond to the propagation direction for higher-order guided fiber modes. In this regard, as illustrated in FIG. 7, an optical fiber link 70' comprised of the optical fiber 74 of FIG. 6 is provided. Like elements are illustrated in FIG. 7 with common element numbers provided in FIG. 6. However, in this embodiment, a different optical attenuation mask or pattern 96 is disposed in the coating material 84 in the light path 73. The optical attenuation pattern 96 may be an inverse pattern to the ring pattern 86 disposed in the coating material 84 in FIG. 6. The optical attenuation pattern 96 in this embodiment is a circular concave pattern comprised of an aperture 98 removed from the coating material 84 and configured of a desired thickness to allow light 78L directed at an angle perpendicular or substantially perpendicular to the optical fiber axis $A_3$ to pass therethrough to the cladding 80 as attenuated light 78L'. This pattern may also be made non-circular or with some other cross-section profile beyond a concave profile. For example, the profile may form a localized region of uniform depth. The light 78L directed at angles to the optical fiber axis $A_3$ are blocked or substantially attenuated by portions 100 of the optical attenuation pattern 96 of greater thickness surrounding the aperture 98. This results in excitation of lower-order modes or mode groups in the optical fiber 74, which may limit modal dispersion and improve optical fiber link bandwidth of the optical fiber link 70'.

Optical attenuation masks or patterns designed to optically attenuate or block light at different launch angles differently may also be disposed on a receiver end of an optical fiber. These include but are not limited to the ring pattern 86 and concave pattern disposed in the optical fibers 40, 74 in FIGS. 6 and 7, respectively. In this regard, FIGS. 8-11 illustrate examples of optical attenuation masks or patterns disposed on receiver ends of optical fibers to provide optical attenuation of propagated light directed towards an optical detector. Such optical attenuation can be to reduce optical power of the directed light or to attenuate or block certain fiber modes or mode groups of light.

Figure 8:
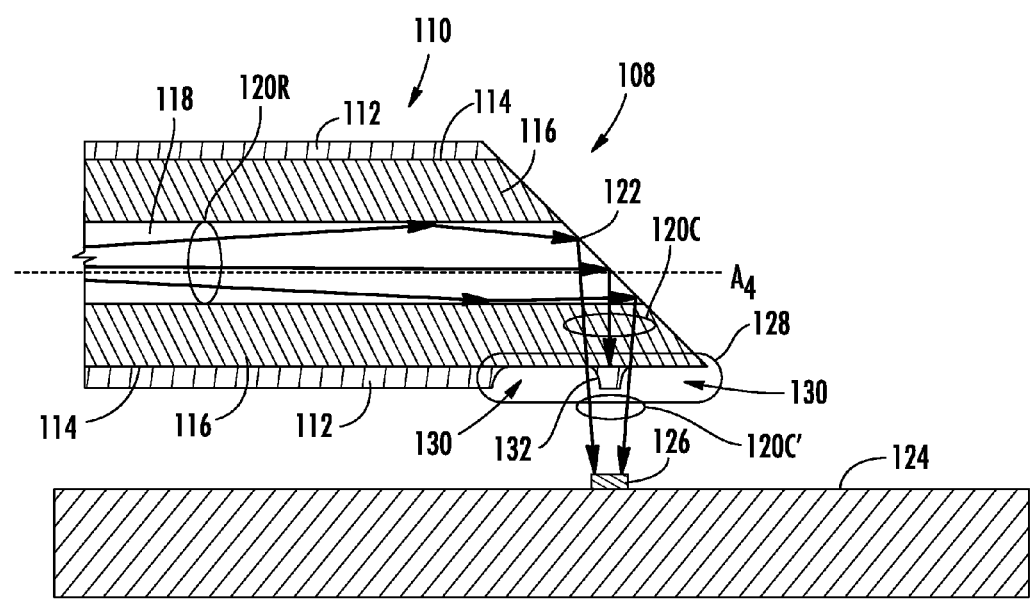
FIG. 8 is a side view of an exemplary selective optical attenuation pattern disposed in a coating material disposed on a detector end of an exemplary optical fiber configured to block or attenuate lower-order mode(s) or mode group(s) of light.

FIG. 8 illustrates a side view of a receiver end 108 of an optical fiber 110 having a coating material 112 applied to the optical fiber 110. The coating material 112 in this embodiment is applied to an outside surface 114 of a cladding 116 surrounding an internal core 118 of the optical fiber 110, similar to the previously discussed embodiments. Light 120R propagates down the internal core 118 of the optical fiber 110 as a result of light launched into the optical fiber 110 from an optical light source (not shown). The light may be launched into the optical fiber 110 by an optical light source such as provided in FIG. 6 or any other embodiments disclosed herein, wherein light is launched and TIR reflected down an internal core of an optical fiber. The light 120R is TIR reflected off of an angle-cleaved end facet 122 disposed on the receiver end 108 of the optical fiber 110 as light 120C. The angle-cleaved end facet 122 may be disposed on the receiver end 108 of the optical fiber 110 using any of the aforementioned processes discussed above for disposing an angle-cleaved end facet on a source end of an optical fiber. The optical fiber 110 is mounted on or near a substrate 124 and aligned with an optical detector 126 in this embodiment such that the light 120C is directed towards the optical detector 126.

In this embodiment, a ring mask or ring pattern 128 is disposed in the coating material 112 to selectively control attenuation of the light 120C. The ring pattern 128 can be disposed on the coating material 112 the same or similar to the ring pattern 86 disposed in the coating material 84 on the source end 76 of the optical fiber 74 in FIG. 6. The ring pattern 128 is disposed in the coating material 112 by removing portions of the coating material 112 in a ring region 130 around a central portion or spot 132 of the coating material 112. Removal may be accomplished according to any of the methods described above, as examples. When the optical fiber 110 is aligned with the optical detector 126, as illustrated in FIG. 8 for example, the central portion 132 of the coating material 112 is configured to block or substantially attenuate the light 120R that would normally reflect off of the angle-cleaved end facet 122 and be guided to the optical detector 126 at angles generally perpendicular or substantially perpendicular to an optical fiber axis $A_4$ of the optical fiber 110. This angle corresponds to the propagation direction for lower-order guided fiber modes or mode groups in this embodiment. Thus, the ring pattern 128 disposed in the coating material 112 disposed on the optical fiber 110 in this embodiment is configured to block or filter lower-order mode light. Light 120R reflecting off of the angle-cleaved end facet 122 of the optical fiber 110 at higher angles passes through the ring region 130 disposed in the coating material 112 and is able to pass as attenuated light 120C' to the optical detector 126. Thus, regardless of whether the light 120R excites lower-order modes or mode groups in the optical fiber 110, such lower-order modes or mode groups are attenuated or blocked from reaching the optical detector 126. Such may limit modal dispersion and improve optical fiber link bandwidth of the optical fiber 110.

Figure 9:
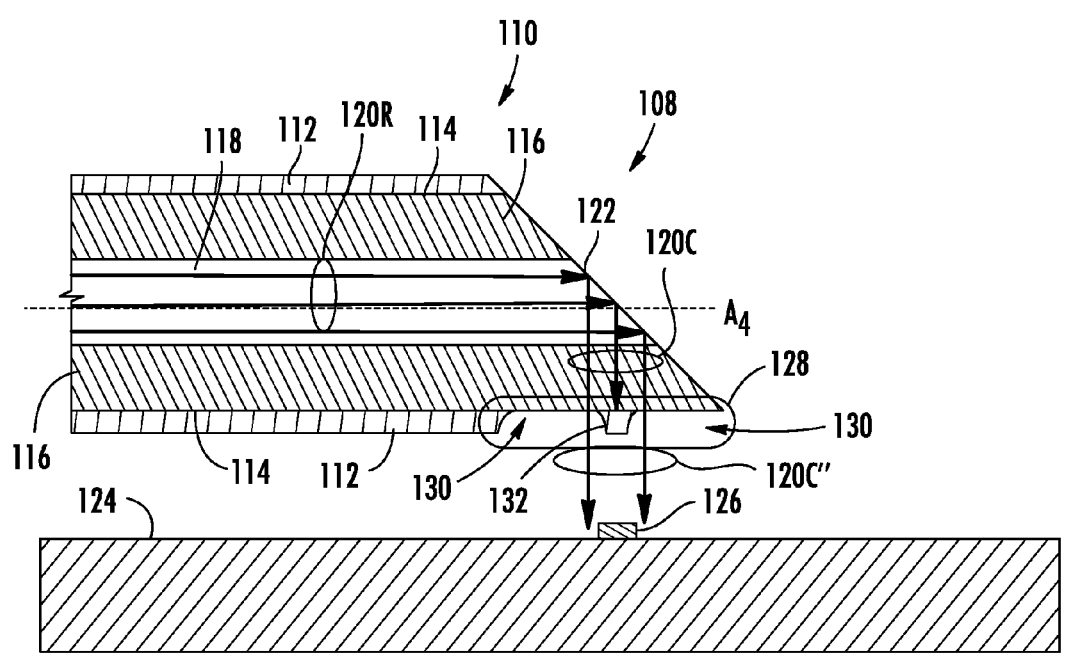
FIGS. 9-11 are additional side views illustrating blocking or attenuating lower-order mode(s) or mode group(s) of light according to the selective optical attenuation pattern disposed in the coating material on the detector end of the optical fiber of FIG. 8.
Figure 10:
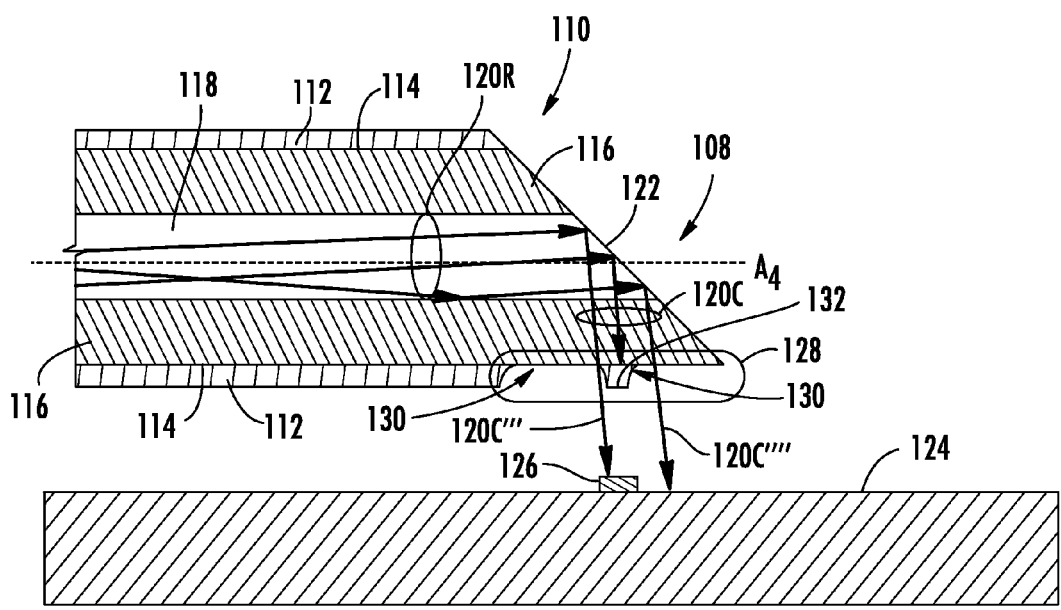
Figure 11:
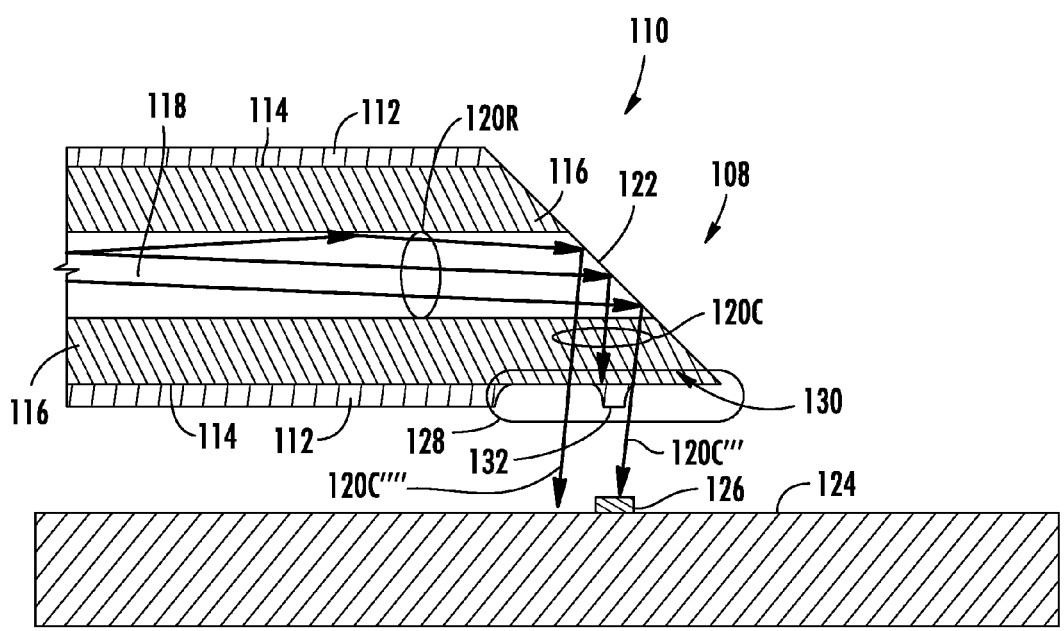

FIGS. 9-11 illustrate side views of the optical fiber 110 of FIG. 8 with the ring pattern 128 attenuating or blocking other modes or mode groups of the light 120R as further examples. FIG. 9 illustrates how the ring pattern 128 disposed in the coating material 112 disposed on the optical fiber 110 can also block certain low-order modes or mode groups of the light 120C. Light 120R propagates down the internal core 118 at angles roughly parallel to the optical fiber axis $A_4$ in this embodiment to excite lower-order modes or mode groups of the optical fiber 110. Certain light reflected off of the angle-cleaved end facet 122 of the optical fiber 110 is attenuated or blocked by the central portion 132 of the ring pattern 128, as provided in FIG. 8. However, other lower-order modes or mode groups of the attenuated light 120C'' pass to the sides of the central portion 132 through the ring region 130. However, the optical fiber 110 is aligned with the optical detector 126 such that the attenuated light 120C'' does not reach the optical detector 126 and thus is effectively filtered. Such may limit modal dispersion and improve optical fiber link bandwidth of the optical fiber 110.

FIGS. 10-11 also illustrate how the ring pattern 128 disposed in the coating material 112 disposed on the optical fiber 110 can also block certain higher-order modes or mode groups (e.g., negative angle) of light 120C while allowing other higher-order modes or mode groups of the light 120C to be detected by the optical detector 126. Certain light 120C reflected off of the angle-cleaved end facet 122 of the optical fiber 110 is attenuated or blocked by the central portion 132 of the ring pattern 128, as provided in FIG. 8. The optical fiber 110 is aligned with the optical detector 126 such that some higher-order modes or mode groups of attenuated light 120C''' pass to the side of the central portion 132 through the ring region 130 and hit the optical detector 126. However, higher-order modes or mode groups of the attenuated light 120C'''' also passing through the ring region 130 of the ring pattern 128 do not reach the optical detector 126 and thus are effectively filtered. Such may limit modal dispersion and improve optical fiber link bandwidth of the optical fiber 110.

Figure 12:
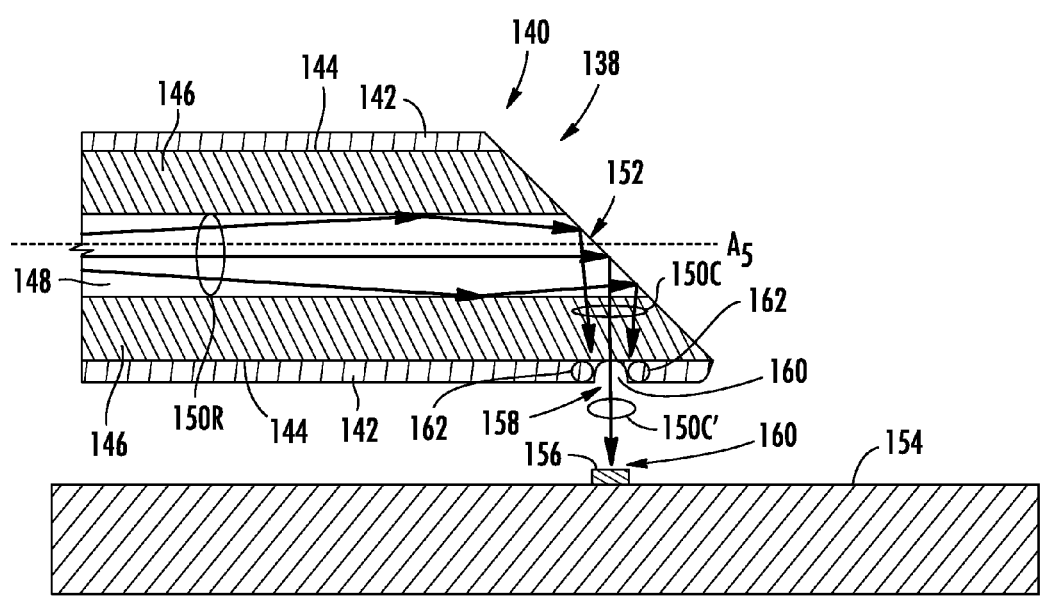
FIG. 12 is a side view of another exemplary selective optical attenuation pattern disposed in a coating material disposed on a detector end of an exemplary optical fiber configured to block or attenuate higher-order mode(s) or mode group(s) of light.

Optical attenuation masks or patterns can also be disposed on a receiver end of an optical fiber to block or optically attenuate lower-order modes or mode groups of light. In this regard, FIG. 12 illustrates a side view of a receiver end 138 of an optical fiber 140 having a coating material 142 applied to the optical fiber 140. The coating material 142 in this embodiment is applied to an outside surface 144 of a cladding 146 surrounding an internal core 148 of the optical fiber 140, similar to the previously discussed embodiments. Light 150R propagates down the internal core 148 of the optical fiber 140 as a result of light launched into the optical fiber 140 from an optical light source (not shown). The light may be launched into the optical fiber 140 by an optical light source such as provided in FIG. 6 or any other embodiments disclosed herein, wherein light is launched and TIR reflected down an internal core of an optical fiber. The light 150R is TIR reflected off of an angle-cleaved end facet 152 disposed on the receiver end 138 of the optical fiber 140 as light 150C. The angle-cleaved end facet 152 may be disposed on the receiver end 138 of the optical fiber 140 using any of the aforementioned processes discussed above for disposing an angle-cleaved end facet on a source end of an optical fiber. The optical fiber 140 is mounted on a substrate 154 and aligned with an optical detector 156 in this embodiment such that the light 150C is directed towards the optical detector 156.

In this embodiment, an optical attenuation pattern 158 may be disposed in the coating material 142 on the receiver end 138 of the optical fiber 140 that is the inverse of the ring pattern 128 disposed in the coating material 112 in FIG. 8 and/or the same or similar to the optical attenuation pattern 96 disposed in the coating material 84 in FIG. 7. In this regard, the optical attenuation pattern 158 in this embodiment is a circular concave pattern comprised of an aperture 160 removed from the coating material 142 and configured of a desired thickness to allow the light 150C reflected from the angle-cleaved end facet 152 perpendicular or generally perpendicular to an optical fiber axis $A_5$ of the optical fiber 140 to pass therethrough as light 150C'. Thus, lower-order modes or mode groups of light 150C' pass through the coating material 142 in this embodiment. The optical fiber 140 may be aligned with the optical detector 156 such that the light 150C' reaches the optical detector 156. Light 150R reflected at angles that are not perpendicular or substantially perpendicular to the optical fiber axis $A_5$ of the optical fiber 140 is blocked or substantially attenuated by portions 162 of the optical attenuation pattern 158 of greater thickness surrounding the aperture 160. Thus, higher-order modes or mode groups of the light 150C' may be blocked from passing through the coating material 142 and reaching the optical detector 156 or substantially attenuated in this embodiment. This may limit modal dispersion and improve optical fiber link bandwidth of the optical fiber 140.

The embodiments disclosed herein are not limited to any particular optical fiber link, optical fiber, angle-cleaving, coating material, and/or coating material depositing or removal processes. Any type of coating material may be employed that provides the desired optical attenuation characteristics. Any thickness of coating material may be provided that provides the desired optical attenuation characteristics. Any type of coating mask or pattern may be used that provides the desired optical attenuation characteristics. Any type of optical light source and optical detector may be employed.

As discussed above, the cleaved fiber ends disclosed herein may be disposed or formed on individual fibers or arrays of fibers using a laser-cleaving process. A polishing process to provide an angled-cleave is also possible. The angle-cleaving process may be performed prior to or after a coating material is disposed on the optical fiber and/or prior to or after removal of a portion of the coating material to provide the desired optical attenuation. Single or multiple laser-cleaved facets may be disposed or formed on the ends of arrayed optical fibers in addition to individual optical fibers. An optical fiber array may be comprised of optical fibers each having an outer surface, an internal core, and a cleaved (e.g., laser-cleaved) fiber end with one or more laser-cleaved facets of the type disclosed herein.

Further, as used herein, it is intended that the terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. An example of a bend-insensitive optical fiber is ClearCurve® optical fiber, manufactured by Corning Incorporated.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An optical fiber apparatus, comprising:
   an optical fiber having a core, a cladding and a coating material disposed on the outer surface of the cladding along with an optical fiber end; and
   wherein the coating material is configured to optically attenuate a portion of light directed to the optical fiber end; and
   an optical attenuation pattern disposed in at least a portion of the coating material of the optical fiber to selectively optically attenuate the portion of the light directed to the optical fiber end.

2. The optical fiber apparatus of claim 1, wherein the coating material includes material comprised from the group consisting of carbon, a metal, and a polymer.

3. The optical fiber apparatus of claim 1, wherein the coating material provides a hermetic seal to the optical fiber.

4. The optical fiber apparatus of claim 1, wherein the optical fiber end is comprised of either a source end or a detector end.

5. The optical fiber apparatus of claim 1, wherein the coating material is provided at a first thickness to control an amount of optical attenuation of the portion of the light directed to the optical fiber end.

6. The optical fiber apparatus of claim 5, wherein the first thickness is between ten (10) micrometers (μm) and two hundred (200) micrometers.

7. The optical fiber apparatus of claim 1, wherein the coating material is disposed on the entire outer surface of the optical fiber end.

8. The optical fiber apparatus of claim 1, wherein the optical fiber end is angle-cleaved.

9. The optical fiber apparatus of claim 1, wherein the optical attenuation pattern is comprised of a ring pattern.

10. The optical fiber apparatus of claim 1, wherein the optical attenuation pattern is comprised of a concave pattern.

11. The optical fiber apparatus of claim 1, wherein the optical attenuation pattern is configured to optically attenuate higher-order mode portions of the light directed to the optical fiber end.

12. The optical fiber apparatus of claim 1, wherein the optical attenuation pattern is configured to optically attenuate lower-order mode portions of the light directed to the optical fiber end.

13. The optical fiber apparatus of claim 1, wherein the optical attenuation pattern is configured to optically attenuate at least one divergence angle of the portion of the light directed to the optical fiber end.

14. A method of providing optical attenuation for an optical fiber link, comprising:
provide an optical fiber having a core, a cladding and a coating material disposed on the outer surface of the cladding along with an optical fiber end;
wherein the coating material on at least a portion of the optical fiber end configured to optically attenuate a portion of light directed to the optical fiber end;
removing a portion of the coating material of the optical fiber to a desired thickness; and
angle cleaving the optical fiber end.

15. The method of claim 14, wherein disposing the coating material comprises disposing the coating material on the entire outer surface of the optical fiber end.

16. The method of claim 14, wherein angle cleaving the optical fiber end further comprises applying a laser beam to the optical fiber end.

17. The method of claim 14, wherein removing the portion of the coating material is performed after the angle cleaving of the optical fiber end.

18. The method of claim 14, wherein removing the portion of the coating material is performed prior to the angle cleaving of the optical fiber end.

19. The method of claim 14, wherein removing the portion of the coating material further comprises applying a laser beam to the coating material to remove the portion of the coating material.

20. The method of claim 19, further comprising controlling a power of the laser beam to remove the portion of the coating material to the desired thickness.

21. The method of claim 19, further comprising controlling a duration of the application of the laser beam to the coating material to remove the portion of the coating material to the desired thickness.

22. The method of claim 14, further comprising disposing an optical attenuation pattern in at least a portion of the coating material.

23. The method of claim 22, wherein disposing the optical attenuation pattern comprises removing the at least a portion of the coating material.

24. The method of claim 22, wherein disposing the optical attenuation pattern comprises etching a pattern in the at least a portion of the coating material.

25. The method of claim 22, wherein disposing the optical attenuation pattern comprises applying a chemical treatment in the at least a portion of the coating material.

26. The method of claim 22, wherein the optical attenuation pattern is comprised of a ring pattern.

27. The method of claim 22, wherein the optical attenuation pattern is comprised of a concave pattern.

28. The method of claim 22, further comprising the optical attenuation pattern optically attenuating higher-order mode portions of the light directed to the optical fiber end.

29. The method of claim 22, further comprising the optical attenuation pattern optically attenuating lower-order mode portions of the light directed to the optical fiber end.

30. The method of claim 22, further comprising the optical attenuation pattern optically attenuating at least one divergence angle of the light directed to the optical fiber end.

31. An optical fiber link, comprising:
an optical light source configured to launch light in a light path;
an optical fiber having a core, a cladding and a coating material disposed on an outer surface of the cladding along with a source end aligned with the optical light source to receive light launched in the light path from the optical light source; and
wherein the coating material of the optical fiber disposed on at least a portion of the source end of the optical fiber in the light path between the optical fiber and the optical light source in at least a portion of the light path configured to optically attenuate at least a portion of the light launched by the optical light source in the light path; and
an optical attenuation pattern disposed in at least a portion of the coating material to selectively attenuate the at least a portion of the light launched by the optical light source in the light path.

32. The optical fiber link of claim 31, wherein the optical attenuation pattern is configured to optically attenuate at least one divergence angle of the portion of the light launched by the optical light source in the light path.

33. An optical fiber link, comprising:
an optical fiber having a core, a cladding and a coating material configured to propagate light received from an optical light source on a source end of the optical fiber to a receiver end of the optical fiber;
an optical detector aligned with the optical fiber to detect light directed from the receiver end of the optical fiber in a light path; and
wherein the coating material disposed on at least a portion of the receiver end of the optical fiber in the light path between the optical fiber and the optical detector configured to optically attenuate at least a portion of the propagated light directed from the receiver end of the optical fiber using an optical attenuation pattern disposed in at least a portion of the coating material to selectively attenuate the at least a portion of the propagated light.

34. The optical fiber link of claim 33, wherein the optical attenuation pattern is configured to optically attenuate at least one divergence angle of the portion of the light directed from the receiver end of the optical fiber.

* * * * *